(12) United States Patent
Da Silva et al.

(10) Patent No.: US 10,652,948 B2
(45) Date of Patent: May 12, 2020

(54) HANDLING OF PARAMETERS PROVIDED IN RELEASE / SUSPEND

(71) Applicant: Telefonaktiebolaget LM Ericsson (publ), Stockholm (SE)

(72) Inventors: Icaro L. J Da Silva, Solna (SE); Gunnar Mildh, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/222,438

(22) Filed: Dec. 17, 2018

(65) Prior Publication Data

US 2019/0306910 A1 Oct. 3, 2019

Related U.S. Application Data

(60) Provisional application No. 62/652,226, filed on Apr. 3, 2018.

(51) Int. Cl.
| | | |
|---|---|---|
| *H04W 76/27* | (2018.01) | |
| *H04W 76/28* | (2018.01) | |
| *H04W 76/30* | (2018.01) | |
| *H04W 8/08* | (2009.01) | |
| *H04W 36/08* | (2009.01) | |
| *H04W 36/30* | (2009.01) | |
| *H04W 72/04* | (2009.01) | |
| *H04W 52/02* | (2009.01) | |

(52) U.S. Cl.
CPC ............ *H04W 76/27* (2018.02); *H04W 8/08* (2013.01); *H04W 36/08* (2013.01); *H04W 36/30* (2013.01); *H04W 52/0216* (2013.01); *H04W 72/0453* (2013.01); *H04W 76/28* (2018.02); *H04W 76/30* (2018.02); *H04W 52/0229* (2013.01)

(58) Field of Classification Search
CPC ..... H04W 76/27; H04W 76/28; H04W 76/30; H04W 8/08; H04W 36/08; H04W 36/30; H04W 72/0453; H04L 1/0017–0022; H04L 1/0025
See application file for complete search history.

(56) References Cited

U.S. PATENT DOCUMENTS

2013/0107727 A1* 5/2013 Lunden ............. H04W 52/0216
370/252
2016/0219608 A1* 7/2016 Awoniyi-Oteri ..........................
H04W 72/1215

(Continued)

OTHER PUBLICATIONS

Catt, "RRC Release procedure in NR", 3GPP TSG-RAN WG2 Meeting #98, Hanzghou, china, May 15, 2017,pp. 1-3, R2-1704231, 3GPP.

(Continued)

*Primary Examiner* — Warner Wong
(74) *Attorney, Agent, or Firm* — Coats & Bennett, PLLC

(57) ABSTRACT

New Radio (NR) RRC includes an RRC_INACTIVE state, which introduces ambiguities in the network's knowledge of UE behavior. A mechanism is introduced for handling parameters received when a UE enters RRC_INACTIVE upon the UE attempting to resume an RRC connection and, as a response, receiving a Release or Suspend message. The timer associated to the mobilityControlInfo (equivalent to T320) is stopped and associated parameters discarded upon receiving RRC Release or Suspend. Information received in a Release or Suspend message is discarded upon receiving RRC Release or RRC Suspend.

14 Claims, 6 Drawing Sheets

(56) References Cited

U.S. PATENT DOCUMENTS

| | | | |
|---|---|---|---|
| 2018/0049244 A1* | 2/2018 | Lee | H04W 76/27 |
| 2018/0092155 A1* | 3/2018 | Hong | H04W 48/20 |
| 2018/0092157 A1* | 3/2018 | Chen | H04W 76/27 |
| 2018/0213452 A1* | 7/2018 | Kim | H04W 36/0033 |
| 2018/0220486 A1* | 8/2018 | Tseng | H04W 76/27 |
| 2018/0234941 A1* | 8/2018 | Kim | H04W 68/005 |
| 2018/0270714 A1* | 9/2018 | Martin | H04W 8/005 |
| 2018/0270895 A1* | 9/2018 | Park | H04W 8/18 |
| 2018/0317110 A1* | 11/2018 | Mallick | H04W 24/10 |
| 2018/0352488 A1* | 12/2018 | Selvaganapathy | H04W 48/16 |
| 2019/0053324 A1* | 2/2019 | Tseng | H04W 76/30 |
| 2019/0166576 A1* | 5/2019 | Kim | H04W 76/28 |
| 2019/0215858 A1* | 7/2019 | Ishii | H04W 72/1289 |
| 2019/0215887 A1* | 7/2019 | Burbidge | H04W 76/19 |
| 2019/0215890 A1* | 7/2019 | Choi | H04W 76/27 |
| 2019/0254109 A1* | 8/2019 | Lee | H04W 68/00 |
| 2019/0268750 A1* | 8/2019 | Lee | H04W 68/00 |
| 2019/0268963 A1* | 8/2019 | Kim | H04W 76/27 |
| 2019/0281651 A1* | 9/2019 | Lee | H04W 76/28 |
| 2019/0306764 A1* | 10/2019 | da Silva | H04W 36/00837 |
| 2019/0335527 A1* | 10/2019 | Byun | H04W 76/20 |
| 2019/0349813 A1* | 11/2019 | Kim | H04W 40/005 |
| 2019/0387570 A1* | 12/2019 | Byun | H04W 8/08 |
| 2019/0394698 A1* | 12/2019 | Jeong | H04W 8/08 |
| 2019/0394753 A1* | 12/2019 | Adjakple | H04W 16/02 |

OTHER PUBLICATIONS

NEC, "Location update at RAN-based notification area boundary", 3GPP TSG-RAN WG2 Meeting #98, Hanzghou, china, May 15, 2017, pp. 1-5, R2-1705269, 3GPP.

LG Electronics Inc., "Inter-RAT mobility between NR and eLTE for Inactive state", 3GPP TSG-RAN WG2 Meeting #99bis, Prague, Czech Republic, Oct. 9, 2017, pp. 1-3, R2-1711690, 3GPP.

Intel, "Stage 3 RRC TP on RRC_Inactive State for E-UTRA connected to 5GC", Change Request, 3GPP TSG-RAN 2 Meeting #101bis, Sanya, China, Apr. 16, 2018, pp. 1-59, R2-180xxxx, 3GPP.

3GPP, 3rd Generation Partnership Project; Technical Specification Group Radio Access Network; Evolved Universal Terrestrial Radio Access (E-UTRA); User Equipment (UE) procedures in idle mode (Release 14); 3GPP TS 36.304 V14.6.0 (Mar. 2018).

3GPP, 3rd Generation Partnership Project; Technical Specification Group Radio Access Network; Evolved Universal Terrestrial Radio Access (E-UTRA); Radio Resource Control (RRC); Protocol specification (Release 15); 3GPP TS 36.331 V15.0.1 (Jan. 2018).

3GPP, 3rd Generation Partnership Project; Technical Specification Group Radio Access Network; NOR; Radio Resource Control (RRC); Protocol specification (Release 15); 3GPP TS 38.331 V15.1.0 (Mar. 2018).

Samsung, "Remaining Issues of RRC Connection Control From Inactive", 3GPP TSG-RAN WG2 #99bis, Prague, Czech Republic, Oct. 9, 2017, pp. 1-7, R2-1711664, 3GPP.

Ericsson, "NR RRC States overview and remaining open issues", 3GPP TSG-RAN WG2 #100, 27 Nov. 1-Dec. 2017, pp. 1-15, Reno, US, Tdoc R2-1713301.

Intel Corporation, "LTE RAN impacts to enable CIoT UP solution", 3GPP TSG RAN WG2 Meeting #93, Feb. 15-19, 2016, pp. 1-12, St. Julian's, Malta, R2-161266.

* cited by examiner

HANDLING OF PARAMETERS PROVIDED IN RELEASE / SUSPEND

This application claims benefit of U.S. Provisional Application Ser. No. 62/652,226, filed 3 Apr. 2018, titled HANDLING OF PARAMETERS PROVIDED IN RELEASE/SUSPEND, the disclosure of which is incorporated by reference herein in its entirety.

FIELD OF INVENTION

The present invention relates generally to wireless communication networks, and in particular to handling of parameters in RRC Release or Suspend messages by a wireless device in RRC_INACTIVE state.

BACKGROUND

Radio Resource Control States in LTE and NR

Radio Resource Control (RRC) is an air interface protocol used in the $3^{rd}$ generation mobile cellular wireless network protocol Universal Mobile Telecommunications System (UMTS), as well as the $4^{th}$ generation protocol, Long Term Evolution (LTE). Modifications to RRC are proposed for the $5^{th}$ generation protocol, New Radio (NR). The Third Generation Partnership Project (3GPP) specifications for UMTS RRC are in Technical Standard (TS) 25.331, and for LTE RRC are in TS 36.331.

FIG. 1 depicts a state diagram of LTE RRC modes. In LTE, two general RRC modes are defined for a wireless device, or User Equipment (UE): RRC_IDLE and RRC_CONNECTED. Within the RRC_CONNECTED mode, a UE transitions between further RRC states, each having lower power consumption, based on inactivity timers. The RRC_CONNECTED mode states for LTE are CELL-DCH (Dedicated Channel), CELL_FACH (Forward Access Channel), CELL_PCH (Cell Paging Channel) and URA_PCH (UTRAN Registration Area, or URA, Paging Channel). This disclosure focuses on transitions between RRC_CONNECTED and RRC_IDLE modes (and analogous NR RRC transitions), not the RRC_CONNECTED states. Accordingly the terms RRC mode and RRC state are used interchangeably herein.

In LTE RRC_IDLE state, a UE is known to the core network (CN) or evolved packet core (EPC), and has an IP address, but is not known/tracked by the Radio Access Network (E-UTRAN) and its base stations (evolved Node B or eNB). The UE can receive broadcast/multicast data (e.g., System Information, or SI); monitors a paging channel to detect incoming calls; may perform neighbor cell measurements; and can do cell (re)selection. A UE in RCC_IDLE may be configured by the network for Discontinuous Reception (DRX).

In the LTE RRC_CONNECTED state, the UE is known by the RAN (E-UTRAN/eNB), as well as the core network, and the mobility of the UE is managed by the network. The UE monitors control channels for downlink data, sends channel quality feedback, and may request uplink resources. The RRC messages RRC Release and RRC Connect transition the UE from RRC_CONNECTED to and from RRC_IDLE state.

FIG. 2 depicts a state diagram of NR RRC states. NR introduces a new RRC state: RRC_INACTIVE, in which the UE is connected to the RAN, but is not actively utilizing resources. The RRC messages RRC Suspend and RRC Resume transition the UE from RRC_CONNECTED to and from RRC_INACTIVE states. NR RRC thus introduces RRC state transitions that do not exist in LTE; accordingly, the handling by UEs of some parameters, timers, and activities is not fully specified. Uncertainty over how various UEs may handle these parameters, timers, and activities could lead to UE behavior divergent from network expectations (or desires), requiring recovery signaling that would not be necessary if the UE behavior were explicitly specified.

In LTE, an RRC_CONNECTED UE enters RRC_IDLE by receiving an "RRCConnetionRelease" message from the network. That may contain a parameter called idleMode-MobilityControlInfo. That field provides dedicated cell reselection priorities to be used for cell reselection, as specified in TS 36.304 V14.6.0. The RRC Connection Release message is used to command the release of an RRC connection. The content of this message can be derived from 3GPP specification 36.331 as shown below:

Signalling radio bearer: SRB1
RLC-SAP: AM
Logical channel: DCCH
Direction: E-UTRAN to UE

| RRCConnectionRelease message | | | |
|---|---|---|---|
| -- ASN1START | | | |
| [...] | | | |
| IdleModeMobilityControlInfo ::= SEQUENCE { | | | |
|     freqPriorityListEUTRA | FreqPriorityListEUTRA | OPTIONAL, | -- Need ON |
|     freqPriorityListGERAN | FreqsPriorityListGERAN | OPTIONAL, | -- Need ON |
|     freqPriorityListUTRA-FDD | FreqPriorityListUTRA-FDD | OPTIONAL, | -- Need ON |
|     freqPriorityListUTRA-TDD | FreqPriorityListUTRA-TDD | OPTIONAL, | -- Need ON |
|     bandClassPriorityListHRPD | BandClassPriorityListHRPD | OPTIONAL, | - Need ON |
|     bandClassPriorityList1XRTT | BandClassPriorityList1XRTT | OPTIONAL, | - Need ON |
|     t320 | ENUMERATED { min5, min10, min20, min30, min60, min120, min180, spare1} | OPTIONAL, | -- Need OR |
|     ..., | | | |
|     [[ freqPriorityListExtEUTRA-r12 | FreqPriorityListExtEUTRA-r12 | OPTIONAL -- Need ON | |
|     ]], | | | |
|     [[ freqPriorityListEUTRA-v1310 | FreqPriorityListEUTRA-v1310 | OPTIONAL, | - |

| RRCConnectionRelease message |
|---|
| - Need ON<br>    freqPriorityListExtEUTRA-v1310    FreqPriorityListExtEUTRA-v1310    OPTIONAL --<br>Need ON<br>    ]]<br>}<br>[...]<br>-- ASN1STOP |

| RRCConnectionRelease field descriptions |
|---|
| [...]<br>idleModeMobilityControlInfo<br>Provides dedicated cell reselection priorities. Used for cell reselection as specified in TS 36.304 [4]. For E-UTRA and UTRA frequencies, a UE that supports multi-band cells for the concerned RAT considers the dedicated priorities to be common for all overlapping bands (i.e. regardless<br>of the ARFCN that is used).<br>[...] |

In LTE, the UE behavior associated to these parameters is defined as follows in the RRC specifications 3GPP TS 36.331 V15.0.1, section 5.3.8.3 Reception of the RCConnectionRelease by the UE:

| |
|---|
| The UE shall:<br>  [...]<br>  1> if the RRCConnectionRelease message includes the<br>  idleModeMobilityControlInfo:<br>      2> store the cell reselection priority information provided by the<br>          idleModeMobilityControlInfo;<br>      2> if the t320 is included:<br>          3> start timer T320, with the timer value set according to<br>             the value of t320;<br>  1> else:<br>      2> apply the cell reselection priority information broadcast in the<br>          system information;<br>  [...] |

The technical standard 36.331 further comprises in section 5.3.8.4 the behaviour of the UE on expiry of timer T320:

| |
|---|
| The UE shall:<br>  1> if T320 expires:<br>      2> if stored, discard the cell reselection priority information<br>          provided by theidleModeMobilityControlInfo or inherited<br>          from another RAT;<br>      2> apply the cell reselection priority information broadcast in the<br>          system information; |

In LTE, these parameters only make sense when the UE enters RRC_IDLE, with or without a suspend indicator. And, from that state, the UE can only enter RRC_CONNECTED either by establishing or resuming an RRC connection. Hence, upon entering RRC_CONNECTED some actions are performed to discard or clean up these parameters and/or stop related timer(s), such as T320. That is shown below in LTE upon receiving the RRCConnectionSetup or RRCConnectionResume message.

It has been agreed in NR that the UE should possibly receive parameters in the RRCRelease and/or RRCSuspend message upon entering RRC_IDLE and/or RRC_INACTIVE. However, in addition to the procedures in LTE where an RRC_IDLE (with suspend indicator) can attempt to enter RRC_CONNECED by starting a resume procedure and possibly entering RRC_CONNECTED, additionally, the following aspects has been agreed for NR RRC which is different from LTE RRC.

FIG. 3 depicts signaling in NR RRC, in which the network may respond to a ResumeRequest from the UE with a Suspend message which immediately orders the UE back to RRC_INACTIVE state. Also, this message will be encrypted. In LTE it is not possible to send a suspend message (Release with suspend indication) directly to the UE trying to resume the connection.

FIG. 4 depicts signaling in NR RRC, in which the network may respond to a ResumeRequest from the UE with a Release message which immediately orders the UE to RRC_IDLE state. Also, this message will be encrypted. In LTE it is not possible to send a release message (Release) directly to the UE trying to resume the connection.

Due to the differences above the following issues occur with handling parameters possibly provided to a UE entering RRC_INACTIVE, e.g., T320 timer, and redirection information:

Since the UE may receive more messages in NR in response to the ResumeRequest (e.g. RRC Reject, RRC Release, RRC Suspend) it is not enough to just stop the timer when receiving the Resume or the Setup message as in LTE.

For the carrier redirection information, in the current state of the art and new NR procedures, it is unclear what would be the UE behavior. In the LTE specifications the following is defined:

| RRCConnectionRelease-r8-IEs ::= | SEQUENCE { |
|---|---|
| releaseCause | ReleaseCause, |
| redirectedCarrierInfo | RedirectedCarrierInfo  OPTIONAL, -- |
| Need ON | |
| ... | |
| RedirectedCarrierInfo ::= | CHOICE { |
| eutra | ARFCN-ValueEUTRA, |
| geran | CarrierFreqsGERAN, |
| utra-FDD | ARFCN-ValueUTRA, |
| utra-TDD | ARFCN-ValueUTRA, |

| | |
|---|---|
| cdma2000-HRPD | CarrierFreqCDMA2000, |
| cdma2000-1xRTT | CarrierFreqCDMA2000, |
| ...., | |
| utra-TDD-r10 | CarrierFreqListUTRA-TDD-r10 |
| } | |

The redirectedCarrierInfo indicates a carrier frequency (downlink for FDD) and is used to redirect the UE to an E UTRA or an inter-RAT carrier frequency, by means of the cell selection upon leaving RRC_CONNECTED as specified in TS 36.304 V14.6.0.

If the UE has entered RRC_INACTIVE and has received a redirectedCarrierInfo field, and, after trying to resume the connection it either receives an RRCSuspend or RRCRelease without a redirectedCarrierInfo field, then according to the existing need code, i.e., Need ON, it is not clear whether the UE shall use the previously provided value, which is still stored, or if that should be discarded.

| | |
|---|---|
| Need ON (Used in downlink only) | Optionally present, No action A field that is optional to signal. If the message is received by the UE, and in case the field is absent, the UE takes no action and where applicable shall continue to use the existing value (and/or the associated functionality). |

For the idleModeMobilityControlInfo field, in the current state of the art and new NR procedures, if the UE enters RRC_INACTIVE and the Suspend message contains the idleModeMobilityControlInfo (or equivalent), the timer T320 may never stop if the UE tries to resume and is suspended or released in response (e.g., in the case of RAN-based Notification Area, or RNA, updates). Also, even if a new timer and parameters are provided in the Release or Suspend message, it remains ambiguous whether the UE shall use the new values or the old values, as these may still be stored at the UE when the UE tries to resume (in case T320 is still running).

When it comes to need codes, that field has a Need OP indication in the respective 3GPP standard, which means the following:

| | |
|---|---|
| Need OP (Used in downlink only) | Optionally present A field that is optional to signal. For downlink messages, the UE is not required to take any special action on absence of the field beyond what is specified in the procedural text or the field description table following the ASN.1 segment. The UE behavior on absence should be captured either in the procedural text or in the field description. |

As it can be seen, there is nothing in LTE specified upon the reception of an RRCConnectionRelease message as that is not possible to occur when the UE is in RRC_IDLE.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a new mechanism is introduced for handling parameters received when the UE enters RRC_INACTIVE upon the UE trying to resume an RRC connection and, as a response, receives a Release or Suspend message.

In one embodiment a method comprises stopping the timer associated to the mobilityControlInfo (equivalent to T320), if running, and discarding the parameters with mobilityControlInfo upon:
  The reception of an RRC Release;
  The reception of an RRC Suspend;
  The reception of an RRC Resume (conventional); or
  The reception of an RRC Setup (conventional);

In another embodiment a method comprises discarding information received in a Release or Suspend message upon:
  The reception of an RRC Release;
  The reception of an RRC Suspend;
  The reception of an RRC Resume (conventional); or
  The reception of an RRC Setup (conventional);

According to embodiments of the present invention, the exact UE actions are known by the network. Also, the network has the possibility to unambiguously configure the UE and obtain an expected behavior. In the particular case of the equivalent timer to T320, the UE stopping the timer avoids the UE to keep running the procedure associated to mobilityControlInfo even though the network does not want that behavior.

One embodiment relates to a method of managing RRC states, performed by a wireless device operative in a wireless communication network. While in an RRC_INACTIVE state, and performing actions related to idle or inactive mobility, RRC signaling is sent to the network requesting to enter an RRC_CONNECTED state. RRC signaling is received from the network directing the wireless device to enter an RRC_IDLE or remain in RRC_INACTIVE state. In response to the received RRC signaling, one or more stored dedicated idle or inactive mobility related parameters are discarded. Also in response to the received RRC signaling, activities associated with the dedicated idle or inactive mobility related parameters are discontinued.

Another embodiment relates to a wireless device operative to manage RRC states, while operative in a wireless communication network. The wireless device includes communication circuitry and processing circuitry operatively connected to the communication circuitry. The processing circuitry is adapted to, while in an RRC_INACTIVE state, and performing actions related to idle or inactive mobility, send RRC signaling to the network requesting to enter an RRC_CONNECTED state; receive RRC signaling from the network directing the wireless device to enter an RRC_IDLE or remain in RRC_INACTIVE state; and in response to the received RRC signaling, discard one or more stored dedicated idle or inactive mobility related parameters; and also in response to the received RRC signaling, discontinue activities associated with the dedicated idle or inactive mobility related parameters.

Yet another embodiment relates to a method of managing a wireless device, performed by a base station operative in a wireless communication network implementing a RCC protocol. RRC signaling, requesting to enter an RRC_CONNECTED state, is received from a wireless device in RRC_IDLE or RRC_INACTIVE state. In response to the request, RRC signaling is sent to the wireless device directing the wireless device to enter an RRC_IDLE or remain in RRC_INACTIVE state. The base station manages the wireless device assuming that, in response to the RRC signaling received by the wireless device, it discards one or more stored idle or inactive mobility related parameters. The base station also manages the wireless device assuming that, in response to the RRC signaling received by the wireless device, it discontinues activities associated with the idle or inactive mobility related parameters.

Still another embodiment relates to a base station operative in a wireless communication network implementing a RCC protocol. The base station includes communication circuitry and processing circuitry operatively connected to the communication circuitry. The processing circuitry is adapted to receive from a wireless device in RRC_IDLE or RRC_INACTIVE state, RRC signaling requesting to enter an RRC_CONNECTED state; in response to the request, send RRC signaling to the wireless device directing the wireless device to enter an RRC_IDLE or remain in RRC_INACTIVE state; manage the wireless device assuming that, in response to the RRC signaling received by the wireless device, it discards one or more stored idle or inactive mobility related parameters; and also manage the wireless device assuming that, in response to the RRC signaling received by the wireless device, it discontinues activities associated with the idle or inactive mobility related parameters.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
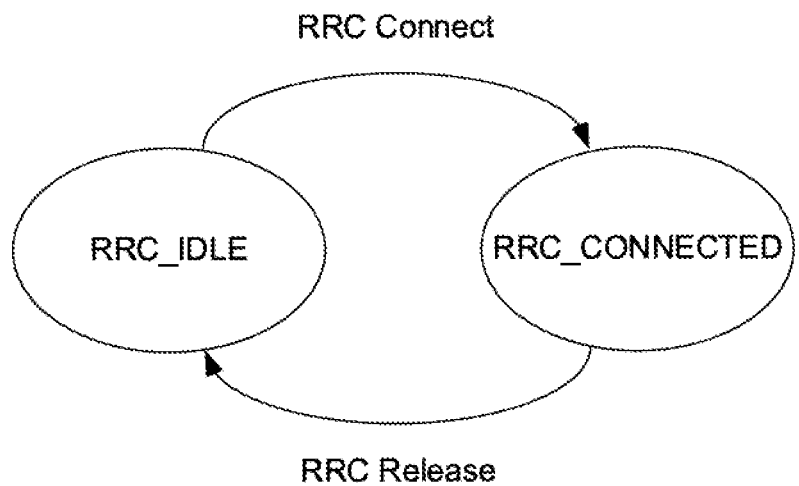
FIG. 1 is an RRC state diagram for LTE.
Figure 2:
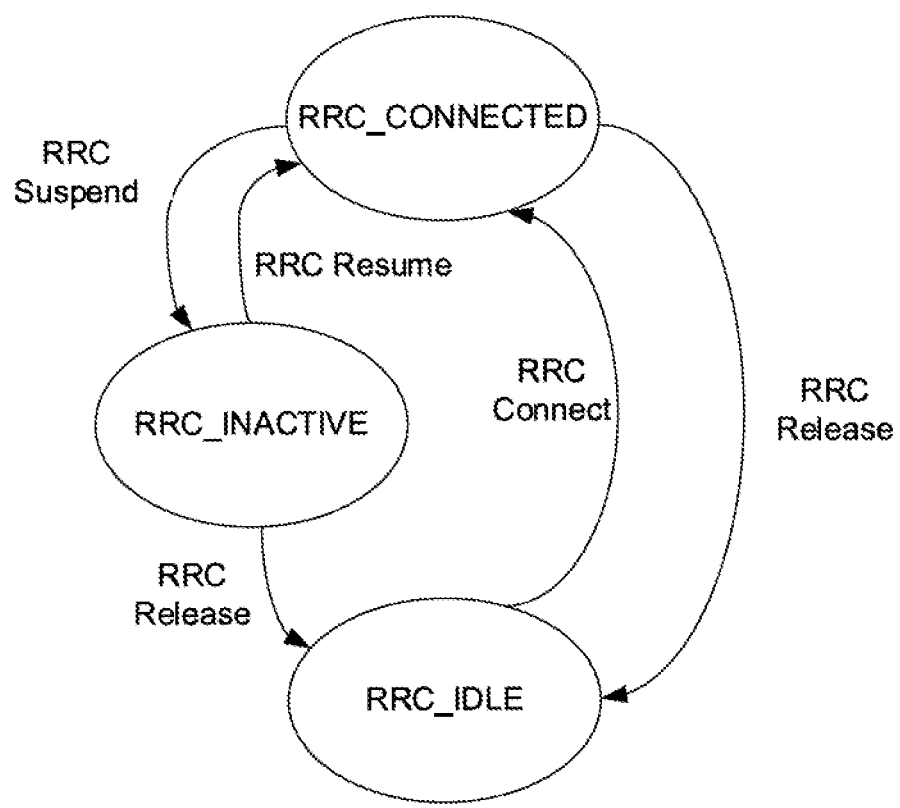
FIG. 2 is an RRC state diagram for NR.
Figure 3:
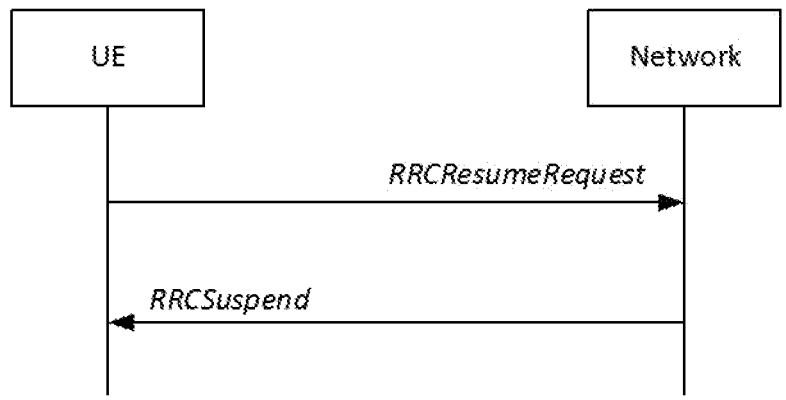
FIG. 3 is a signaling diagram of a UE requesting resumption from RRC_INACTIVE state and being suspended back to RRC_INACTIVE.
Figure 4:
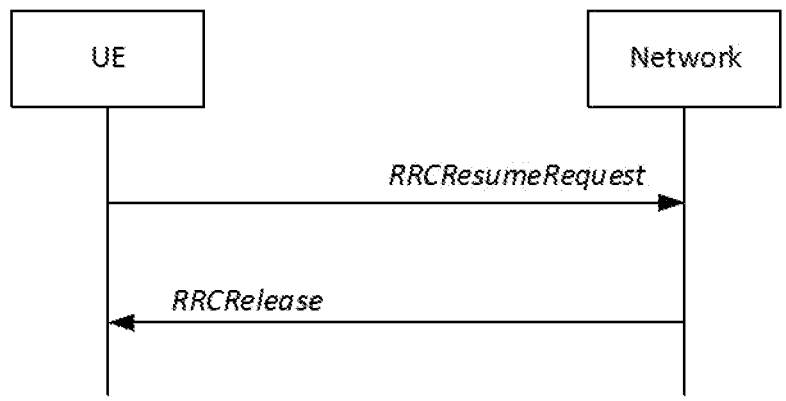
FIG. 4 is a signaling diagram of a UE requesting resumption from RRC_INACTIVE state and being released to RRC_IDLE.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention. At least some of the embodiments may be described herein as applicable in certain contexts and/or wireless network types for illustrative purposes, but the embodiments are similarly applicable in other contexts and/or wireless network types not explicitly described.

According to one embodiment, a method comprises:

The UE receiving in RRC Release or RRC Suspend message (transitioning to RRC_INACTIVE) one or multiple idle/inactive mobility related parameters controlled by a timer, the UE starts the timer and, upon trying to resume an RRC connection, if the timer is running, and:

Upon the reception of an RRC Release message, the UE stops the timer and stops performing the actions associated;

Upon the reception of an RRC Suspend message, the UE stops the timer and stops performing the actions associated;

The UE receiving in RRC Release or RRC Suspend message (transitioning to RRC_INACTIVE) one or multiple idle/inactive mobility related parameters, upon trying to resume an RRC connection and:

Upon the reception of an RRC Release message, the UE discards the stored idle/inactive mobility related parameters and stops performing the actions associated;

Upon the reception of an RRC Suspend message, the UE discards the stored idle/inactive mobility related parameters and stops performing the actions associated;

A used herein, idle/inactive mobility related parameters can be mobilityControlInfo (e.g. idleMobilityControlInfo), redirection carrier information, cell reselection offsets, cell quality derivation parameters, etc.

Implementation in RRC Specifications According to One Embodiment

To exemplify the mechanism, described below is the usage in the case of the IdleMobilityControlInfo field provided in RRC Release or RRC suspend and controlled by a timer. The field redirectedCarrierOffsetDedicated is also included.

The UE shall:
    1> discard any stored UE AS context and I-RNTI;
    1> delay the following actions defined in this sub-clause X ms from the moment the
        RRCRelease message was received or optionally when lower layers indicate that the
        receipt of the RRCRelease message has been successfully acknowledged, whichever is
        earlier;
    Editor's Note: How to set the value of X (whether it is configurable, or fixed to 60ms as in
                LTE, etc.).
    1> discard any stored UE AS context and I-RNTI;
    1> if stored, discard the cell reselection priority information provided by the
        idleModeMobilityControlInfo or inherited from another RAT;
    1> if stored, discard the dedicated offset provided by the redirectedCarrierOffsetDedicated;
    1> if stored, discard the redirectedCarrierInfo;
    1> stop timer T320, if running;
    1> stop timer T322 (associated to the redirectedCarrierInfo);
    1> if stored, discard any information associated to inactive/idle mobility and stop associate
        timers;
    1> if the RRCRelease message includes the idleModeMobilityControlInfo:
        2> store the cell reselection priority information provided by the
            idleModeMobilityControlInfo;
        2> if the t320 is included:
            3> start timer T320, with the timer value set according to the value of t320;
    1> else:
        2> apply the cell reselection priority information broadcast in the system information;
    Editor's Note: FFS Whether RRCRelease supports a mechanism equivalent to
                loadBalancingTAURequired.
    1> If the RRCConnectionRelease message includes the redirectedCarrierInfo:
        2> if the redirectedCarrierOffsetDedicated is included in the redirectedCarrierInfo:
            3> store the dedicated offset for the frequency in redirectedCarrierInfo;
            3> start timer T322, with the timer value set according to the value of T322 in
                redirectedCarrierInfo;
    1> perform the actions upon going to RRC_IDLE as specified in 5.3.11;
    Editor's Note: FFS Whether there needs to be different release causes and actions
                associated.
    Editor's Note: FFS Whether we will instead use RRCRelease (e.g. with suspend indicator).

5.3.14.3 Reception of the RRCSuspend by the UE

The UE shall:
    1> delay the following actions defined in this sub-clause X ms from the moment the
        RRCSuspend message was received or optionally when lower layers indicate that the
        receipt of the RRCSuspend message has been successfully acknowledged, whichever is
        earlier;
    Editor's Note: How to set the value of X (whether it is configurable, or fixed to 60ms as in
                LTE, etc.).
    1> if stored, discard the cell reselection priority information provided by the
        idleModeMobilityControlInfo or inherited from another RAT;
    1> if stored, discard the dedicated offset provided by the redirectedCarrierOffsetDedicated;
    1> if stored, discard the redirectedCarrierInfo;
    1> stop timer T320, if running;
    1> stop timer T322 (associated to the redirectedCarrierInfo);
    1> if stored, discard any information associated to inactive/idle mobility and stop associate
        timers;
    1> if the RRCSuspend message includes the idleModeMobilityControlInfo:
        2> store the cell reselection priority information provided by the
            idleModeMobilityControlInfo;
        2> if the t320 is included:
            3> start timer T320, with the timer value set according to the value of t320;
    1> else:
        2> apply the cell reselection priority information broadcast in the system information;
    1> If the RRCConnectionRelease message includes the redirectedCarrierInfo:
        2> if the redirectedCarrierOffsetDedicated is included in the redirectedCarrierInfo:
            3> store the dedicated offset for the frequency in redirectedCarrierInfo;
            3> start timer T322, with the timer value set according to the value of T322 in
                redirectedCarrierInfo;
1> store the following information provided by the network: resumeIdentity,
    nextHopChainingCount, ran-PagingCycle and ran-NotificationAreaInfo;
1> re-establish RLC entities for all SRBs and DRBs;
1> except if the RRCSuspend message was received in response to an
    RRCResumeRequest:
    2> store the UE AS Context including the current RRC configuration, the current security
        context, the PDCP state including ROHC state, C-RNTI used in the source PCell, the
        cellIdentity and the physical cell identity of the source PCell;
1> suspend all SRB(s) and DRB(s), except SRB0;
1> start timer T380, with the timer value set to periodic-RNAU-timer,
1> indicate the suspension of the RRC connection to upper layers;

1> configure lower layers to suspend integrity protection and ciphering;
1> enter RRC_INACTIVE and perform procedures as specified in TS 38.304 [21]

| | | |
|---|---|---|
| T320 | Upon receiving t320 or upon cell (re)selection to NR from another RAT with validity time configured for dedicated priorities (in which case the remaining validity time is applied). | Upon entering RRC_CONNECTED, when PLMN selection is performed on request by NAS, or upon cell (re)selection to another RAT (in which case the timer is carried on to the other RAT) or upon receiving an RRC Release or upon receiving an RRC Suspend. | Discard the cell reselection priority information provided by dedicated signalling. |

Methods and Apparatuses

Figure 5:
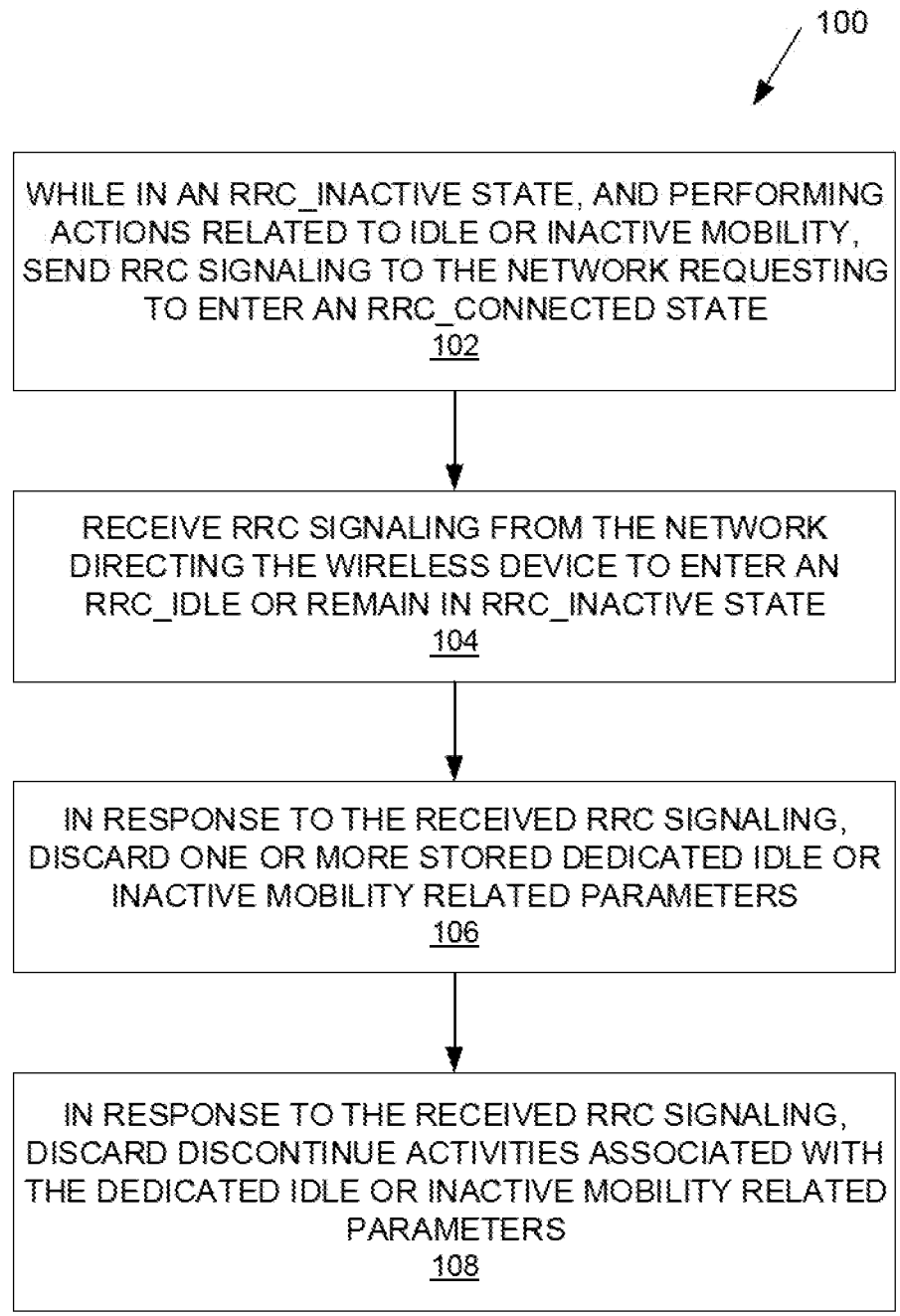
FIG. 5 is a flow diagram of a method of managing RRC states, performed by a wireless device operative in a wireless communication network.

FIG. 5 depicts a method 100 of managing Radio Resource Control (RRC) states, performed by a wireless device operative in a wireless communication network, in accordance with particular embodiments. While in an RRC_INACTIVE state, and performing actions related to idle or inactive mobility, RRC signaling is sent to the network requesting to enter an RRC_CONNECTED state (block 102). RRC signaling is received from the network directing the wireless device to enter an RRC_IDLE or remain in RRC_INACTIVE state (block 104). In response to the received RRC signaling, one or more stored dedicated idle or inactive mobility related parameters are discarded (block 106). Also in response to the received RRC signaling, activities associated with the dedicated idle or inactive mobility related parameters are discontinued (block 108).

Figure 6:
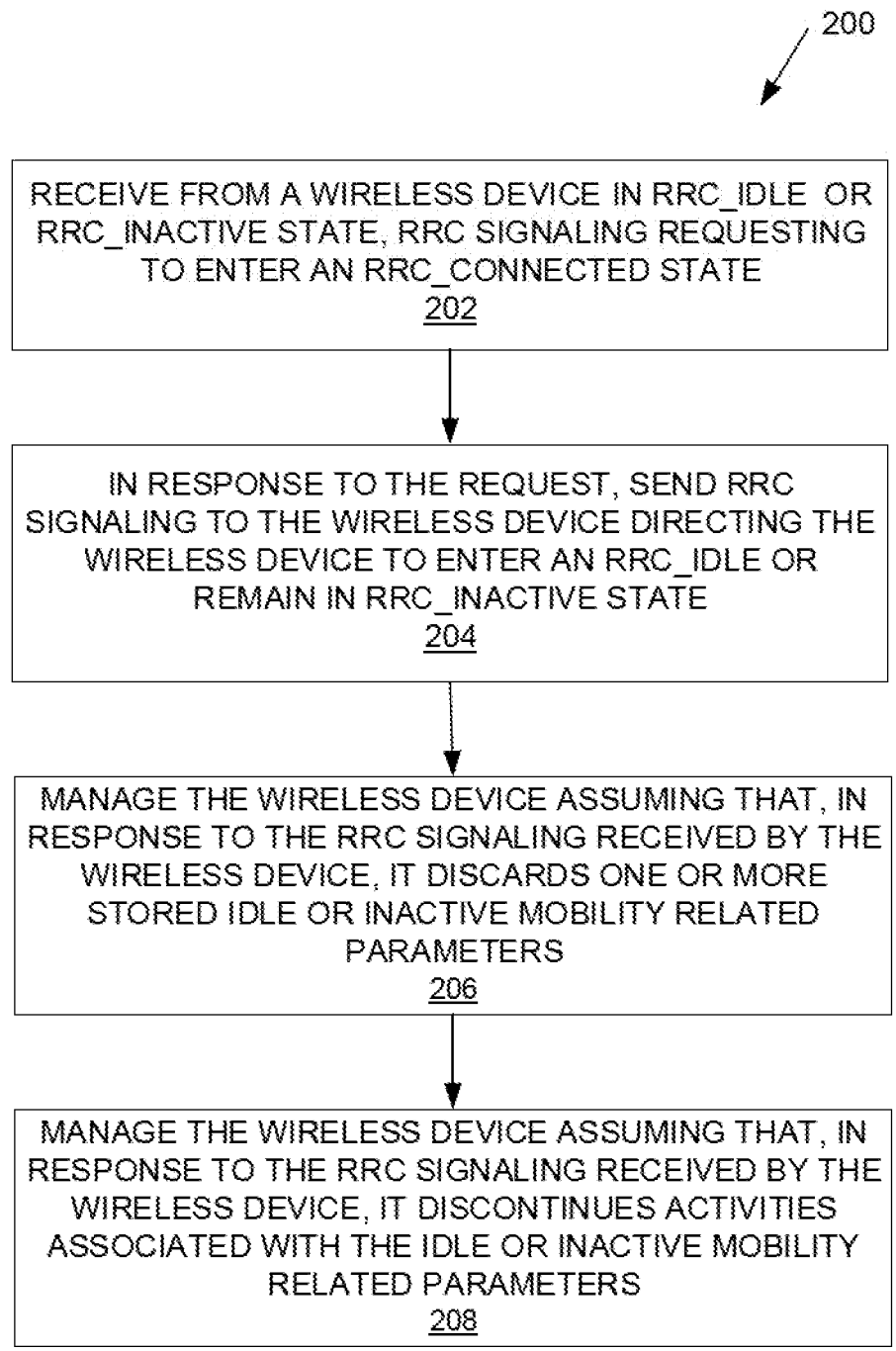
FIG. 6 is a flow diagram of a method of managing a wireless device, performed by a base station operative in a wireless communication network implementing a RCC protocol.

FIG. 6 depicts a method 200 of managing a wireless device, performed by a base station operative in a wireless communication network implementing a Radio Resource Control (RCC) protocol, in accordance with other particular embodiments. RRC signaling, requesting to enter an RRC_CONNECTED state, is received from a wireless device in RRC_IDLE or RRC_INACTIVE state (block 202). In response to the request, RRC signaling is sent to the wireless device directing the wireless device to enter an RRC_IDLE or remain in RRC_INACTIVE state (block 204). The wireless device is managed assuming that, in response to the RRC signaling received by the wireless device, it discards one or more stored idle or inactive mobility related parameters (block 206). The wireless device is further managed assuming that, in response to the RRC signaling received by the wireless device, it discontinues activities associated with the idle or inactive mobility related parameters (block 208).

The apparatuses described herein may perform the methods 100, 200 herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
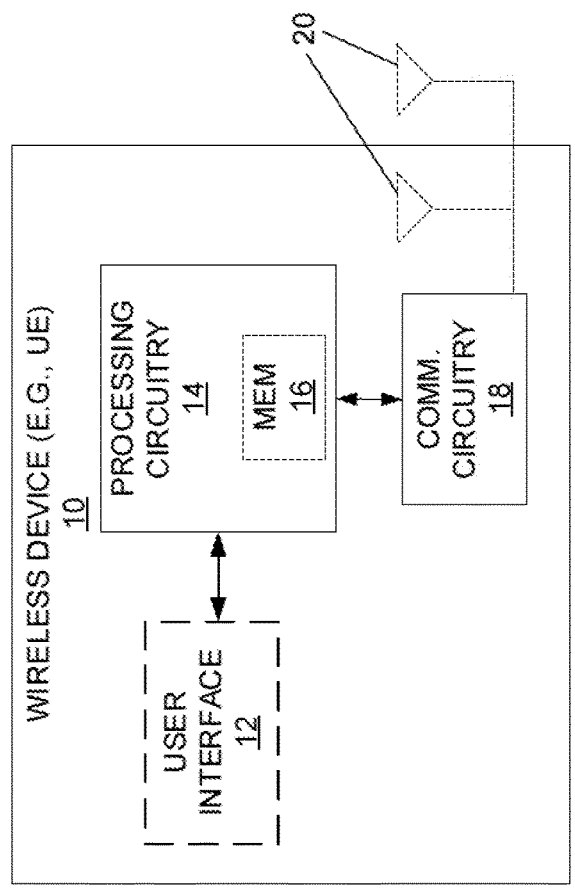
FIG. 7 is a block diagram of a wireless device.

FIG. 7 for example illustrates a wireless device 10 as implemented in accordance with one or more embodiments. A wireless device 10 is any type device capable of communicating with a network node and/or access point using radio signals. A wireless device 10 may therefore refer to a machine-to-machine (M2M) device, a machine-type communications (MTC) device, a Narrowband Internet of Things (NB IoT) device, etc. The wireless device 10 may also be referred to as a User Equipment (UE), such as a cellular telephone or "smartphone," however, the term UE should be understood to encompass any wireless device 10. A wireless device 10 may also be referred to as a radio device, a radio communication device, a wireless device, a wireless terminal, or simply a terminal—unless the context indicates otherwise, the use of any of these terms is intended to include device-to-device UEs or devices, machine-type devices, or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices, although referred to as UEs, but may be configured to transmit and/or receive data without direct human interaction.

In some embodiments, the wireless device 10 includes a user interface 12 (display, touchscreen, keyboard or keypad, microphone, speaker, and the like); in other embodiments, such as in many M2M, MTC, or NB IoT scenarios, the wireless device 10 may include only a minimal, or no, user interface 12 (as indicated by the dashed lines of block 12 in FIG. 7). The wireless device 10 also includes processing circuitry 14; memory 16; and communication circuitry 18 connected to one or more antennas 20, to effect wireless communication across an air interface to one or more radio network nodes, such as a base station, and/or access points. As indicated by the dashed lines, the antenna(s) 20 may protrude externally from the wireless device 10, or the antenna(s) 20 may be internal. In some embodiments, a wireless device 10 may include a sophisticated user interface 32, and may additionally include features such as a camera, accelerometer, satellite navigation signal receiver circuitry, vibrating motor, and the like (not depicted in FIG. 7).

According to embodiments of the present invention, the memory 16 is operative to store, and the processing circuitry 14 operative to execute, software which when executed is operative to cause the wireless device 10 to managing Radio Resource Control (RRC) states. In particular, the software, when executed on the processing circuitry 14, is operative to perform the method 100 described and claimed herein. The processing circuitry 14 in this regard may implement certain functional means, units, or modules.

Figure 8:
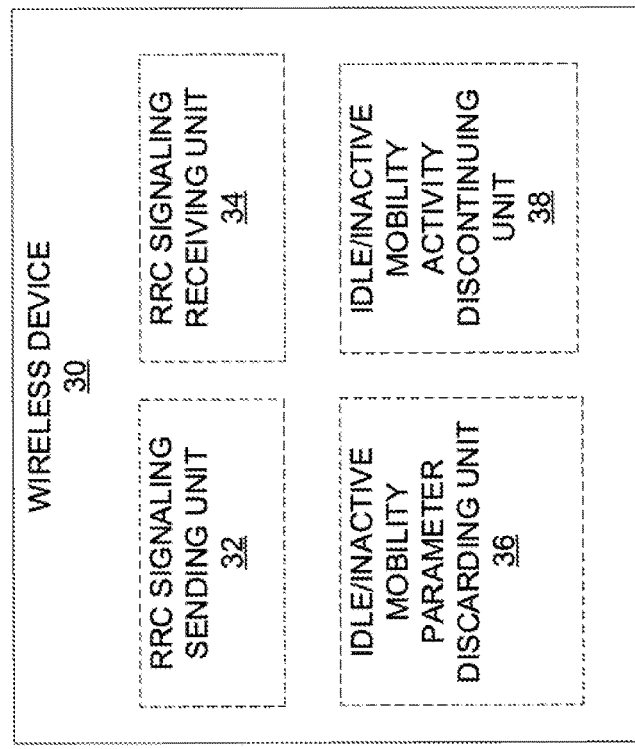
FIG. 8 is a block diagram of a wireless device showing functional units.

FIG. 8 illustrates a schematic block diagram of a wireless device 30 in a wireless network according to still other embodiments. As shown, the wireless device 30 implements various functional means, units, or modules, e.g., via the processing circuitry 14 in FIG. 7 and/or via software code. These functional means, units, or modules, e.g., for implementing the method(s) herein, include for instance: an RRC signaling sending unit 32, an RRC signaling receiving unit 34, an IDLE/INACTIVE mobility parameter discarding unit 36, and an IDLE/INACTIVE mobility activity discontinuing unit 38.

The RRC signaling sending unit 32 is configured to, while in an RRC_INACTIVE state, and performing actions related to idle or inactive mobility, send RRC signaling to the network requesting to enter an RRC_CONNECTED state. RRC signaling receiving unit 34 is configured to receive RRC signaling from the network directing the wireless device to enter an RRC_IDLE or remain in RRC_INACTIVE state. The IDLE/INACTIVE mobility parameter discarding unit 36 is configured to, in response to the received RRC signaling, discard one or more stored dedicated idle or inactive mobility related parameters. The IDLE/INACTIVE mobility activity discontinuing unit 38 is configured to, in response to the received RRC signaling, discontinue activities associated with the dedicated idle or inactive mobility related parameters.

Figure 9:
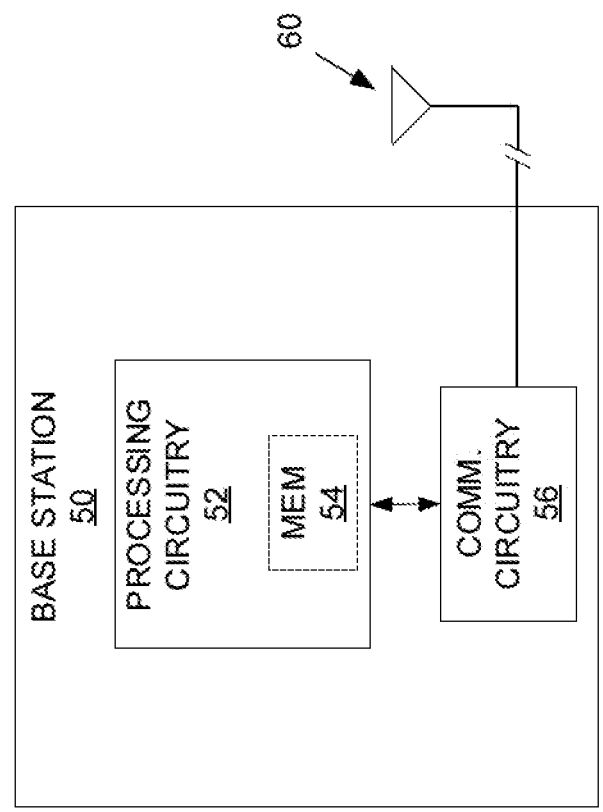
FIG. 9 is a block diagram of a base station.

FIG. 9 depicts a base station 50 operative in a wireless communication network. The base station 50 includes processing circuitry 52; memory 54; and communication circuitry 56 connected to one or more antennas 60, to effect wireless communication across an air interface to one or more wireless devices 10. As indicated by the broken connection to the antenna(s) 60, the antenna(s) 60 may be physically located separately from the base station 50, such as mounted on a tower, building, or the like. Although the memory 56 is depicted as being internal to the processing circuitry 54, those of skill in the art understand that the memory 56 may also be external. Those of skill in the art additionally understand that virtualization techniques allow some functions nominally executed by the processing circuitry 54 to actually be executed by other hardware, perhaps remotely located (e.g., in the so-called "cloud"). The base station 50 is known in LTE as a eNodeB or eNB, and in New Radio (NR) as gNB. In general, in other wireless communication networks, the base station 50 may be known as a Radio Base Station, Base Transceiver Station, Access Point, or the like.

According to one embodiment of the present invention, the processing circuitry 54 is operative to cause the base station 50 to manage a wireless device 10 in a wireless communication network implementing a Radio Resource Control (RCC) protocol. In particular, the processing circuitry 54 is operative to perform the method 200 described and claimed herein. The processing circuitry 54 in this regard may implement certain functional means, units, or modules.

Figure 10:
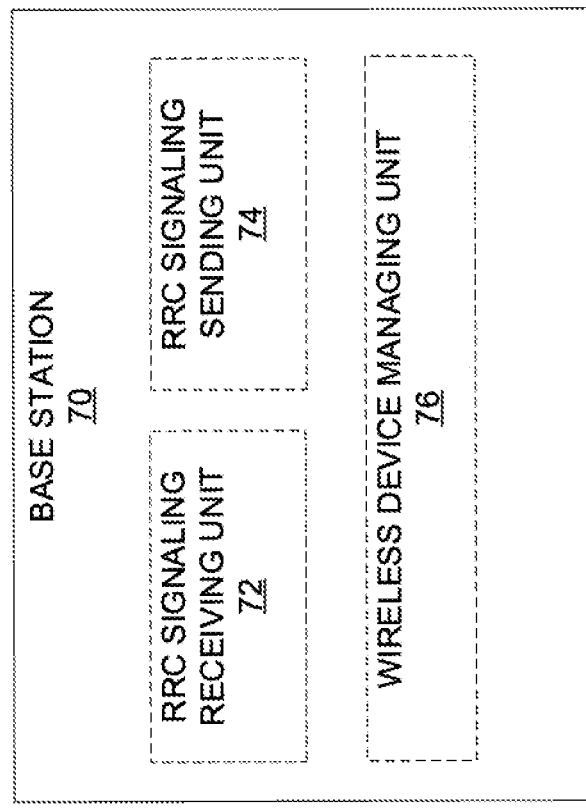
FIG. 10 is a block diagram of a base station showing functional units.

FIG. 10 illustrates a schematic block diagram of a base station 70 in a wireless network according to still other embodiments. As shown, the base station 72 implements various functional means, units, or modules, e.g., via the processing circuitry 52 in FIG. 9 and/or via software code. These functional means, units, or modules, e.g., for implementing the method 200 herein, include for instance: an RRC signaling receiving unit 72, an RRC signaling sending unit 74, and a wireless device management unit 76.

The RRC signaling receiving unit 72 is configured to receive from a wireless device in RRC_IDLE or RRC_INACTIVE state, RRC signaling requesting to enter an RRC_CONNECTED state. The RRC signaling sending unit 74 is configured to, in response to the request, send RRC signaling to the wireless device directing the wireless device to enter an RRC_IDLE or remain in RRC_INACTIVE state. The wireless device management unit 76 is configured to manage the wireless device assuming that, in response to the RRC signaling received by the wireless device, it discards one or more stored idle or inactive mobility related parameters, and further to manage the wireless device assuming that, in response to the RRC signaling received by the wireless device, it discontinues activities associated with the idle or inactive mobility related parameters.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of managing Radio Resource Control, RRC, states, performed by a wireless device operative in a wireless communication network, the method comprising:
   while in an RRC_INACTIVE state, and performing actions related to idle or inactive mobility, sending RRC signaling to the network requesting to enter an RRC_CONNECTED state;
   receiving RRC signaling from the network directing the wireless device to enter an RRC_IDLE or remain in RRC_INACTIVE state; and
   in response to the received RRC signaling,
      discarding one or more stored dedicated idle or inactive mobility related parameters; and
      discontinuing activities associated with the dedicated idle or inactive mobility related parameters; and
      wherein an idle or inactive mobility related parameter is controlled by a timer, and wherein the timer is running at the time of sending RRC signaling to the network requesting to enter an RRC_CONNECTED state, further comprising:
in response to receiving RRC signaling from the network directing the wireless device to enter an RRC_IDLE or remain in RRC_INACTIVE state, stopping the timer and discontinuing activities associated with the timer.

2. The method of claim 1 wherein performing actions related to idle or inactive mobility comprises performing cell reselection according to dedicated priorities.

3. The method of claim 2 wherein performing cell reselection according to dedicated priorities comprises performing cell reselection while a validity timer of the cell reselection priority parameter is running.

4. The method of claim 1 wherein the idle or inactive mobility related parameters comprise mobility control information.

5. The method of claim 1 wherein the idle or inactive mobility related parameters comprise redirection carrier information.

6. The method of claim 1 wherein the idle or inactive mobility related parameters comprise cell reselection priority information.

7. The method of claim 1 wherein the idle or inactive mobility related parameters comprise cell quality derivation parameters.

8. A wireless device operative to manage Radio Resource Control, RRC, states, while operative in a wireless communication network, comprising:
communication circuitry; and
processing circuitry operatively connected to the communication circuitry, and adapted to
while in an RRC_INACTIVE state, and performing actions related to idle or inactive mobility, send RRC signaling to the network requesting to enter an RRC_CONNECTED state;
receive RRC signaling from the network directing the wireless device to enter an RRC_IDLE or remain in RRC_INACTIVE state; and
in response to the received RRC signaling,
discard one or more stored dedicated idle or inactive mobility related parameters; and
discontinue activities associated with the dedicated idle or inactive mobility related parameters; and
wherein an idle or inactive mobility related parameter is controlled by a timer, and
wherein the timer is running at the time of sending RRC signaling to the network requesting to enter an RRC_CONNECTED state, wherein the processing circuitry is further adapted to:
in response to receiving RRC signaling from the network directing the wireless device to enter an RRC_IDLE or remain in RRC_INACTIVE state, stop the timer and discontinue activities associated with the timer.

9. The wireless device of claim 8 wherein the processing circuitry is adapted to perform actions related to idle or inactive mobility by performing cell reselection according to dedicated priorities.

10. The wireless device of claim 9 wherein performing cell reselection according to dedicated priorities comprises performing cell reselection while a validity timer of the cell reselection priority parameter is running.

11. The wireless device of claim 8 wherein the idle or inactive mobility related parameters comprise mobility control information.

12. The wireless device of claim 8 wherein the idle or inactive mobility related parameters comprise redirection carrier information.

13. The wireless device of claim 8 wherein the idle or inactive mobility related parameters comprise cell reselection priority information.

14. The wireless device of claim 8 wherein the idle or inactive mobility related parameters comprise cell quality derivation parameters.

* * * * *

UNITED STATES PATENT AND TRADEMARK OFFICE
CERTIFICATE OF CORRECTION

PATENT NO. : 10,652,948 B2
APPLICATION NO. : 16/222438
DATED : May 12, 2020
INVENTOR(S) : Da Silva et al.

Page 1 of 1

It is certified that error appears in the above-identified patent and that said Letters Patent is hereby corrected as shown below:

In the Specification

In Column 3, Line 21, Under "RRCConnectionRelease field descriptions" delete "of the ARFCN that is used)." and insert the same in Line 20 after "regardless" as a continuation line.

In Column 13, Line 40, delete "memory 56" and insert -- memory 54 --, therefor.

In Column 13, Lines 40-41, delete "processing circuitry 54," and insert -- processing circuitry 52, --, therefor.

In Column 13, Line 41, delete "memory 56" and insert -- memory 54 --, therefor.

In Column 13, Lines 44-45, delete "processing circuitry 54," and insert -- processing circuitry 52, --, therefor.

In Column 13, Line 53, delete "processing circuitry 54" and insert -- processing circuitry 52 --, therefor.

In Column 13, Lines 56-57, delete "processing circuitry 54" and insert -- processing circuitry 52 --, therefor.

In Column 13, Line 58, delete "processing circuitry 54" and insert -- processing circuitry 52 --, therefor.

In Column 13, Line 63, delete "base station 72" and insert -- base station 70 --, therefor.

Signed and Sealed this
Eighth Day of December, 2020

Andrei Iancu
*Director of the United States Patent and Trademark Office*